United States Patent
Shafer et al.

(10) Patent No.: US 7,376,719 B1
(45) Date of Patent: May 20, 2008

(54) AUTOMATIC GENERATION OF CONFIGURATION DATA USING IMPLEMENTATION-SPECIFIC CONFIGURATION POLICIES

(75) Inventors: Philip A. Shafer, Raleigh, NC (US); Robert P. Enns, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 847 days.

(21) Appl. No.: 10/824,155

(22) Filed: Apr. 14, 2004

(51) Int. Cl.
*G06F 15/177* (2006.01)

(52) U.S. Cl. .................. 709/220; 709/203; 709/223

(58) Field of Classification Search ............... 709/220, 709/221, 222
See application file for complete search history.

(56) References Cited

U.S. PATENT DOCUMENTS

| | | | |
|---|---|---|---|
| 5,751,967 A * | 5/1998 | Raab et al. ................. 709/228 |
| 5,784,702 A * | 7/1998 | Greenstein et al. ......... 711/173 |
| 5,838,918 A * | 11/1998 | Prager et al. ............... 709/221 |
| 5,872,928 A * | 2/1999 | Lewis et al. ................ 709/222 |
| 5,889,953 A * | 3/1999 | Thebaut et al. ............. 709/221 |
| 6,167,445 A * | 12/2000 | Gai et al. ................... 709/223 |
| 6,539,425 B1 * | 3/2003 | Stevens et al. ............. 709/220 |
| 6,598,057 B1 * | 7/2003 | Synnestvedt et al. ....... 707/200 |
| 6,611,863 B1 * | 8/2003 | Banginwar .................. 709/220 |
| 6,760,761 B1 * | 7/2004 | Sciacca ...................... 709/220 |
| 6,941,355 B1 * | 9/2005 | Donaghey et al. .......... 709/220 |
| 6,988,133 B1 * | 1/2006 | Zavalkovsky et al. ...... 709/223 |
| 7,032,014 B2 * | 4/2006 | Thiyagarajan et al. ...... 709/220 |
| 7,072,958 B2 * | 7/2006 | Parmar et al. .............. 709/223 |
| 7,096,256 B1 * | 8/2006 | Shafer ........................ 709/220 |
| 7,133,907 B2 * | 11/2006 | Carlson et al. ............. 709/220 |
| 2002/0157023 A1 * | 10/2002 | Callahan et al. ............ 713/201 |

OTHER PUBLICATIONS

Shafer, Philip et al., U.S. Appl. No. 10/824,276, entitled "Automatic Application of Implementation-Specific Configuration Policies," filed Apr. 14, 2004.

* cited by examiner

*Primary Examiner*—Michael Won
(74) *Attorney, Agent, or Firm*—Shumaker & Sieffert, P.A.

(57) ABSTRACT

Techniques are described for application of implementation-specific configuration policies within a network device to generate configuration data. For example, a device, such as a router, may comprise memory to store operational configuration data and candidate configuration data. The device further includes a control unit to apply an implementation-specific configuration policy to alter changes to the candidate configuration data, and commit the altered candidate configuration data to the operational configuration data. In applying the implementation-specific configuration policy, the control unit may insert additional configuration data or replace portions of the candidate configuration data with additional configuration data. In this manner, the device may detect misconfiguration and make changes to the candidate configuration data, thereby performing proactive error correction.

25 Claims, 4 Drawing Sheets

AUTOMATIC GENERATION OF CONFIGURATION DATA USING IMPLEMENTATION-SPECIFIC CONFIGURATION POLICIES

TECHNICAL FIELD

The invention relates to computer networks, and more particularly, to configuring devices within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within the network, referred to as routers, maintain tables of routing information that describe available routes through the network. Each route defines a path between two locations on the network. Upon receiving an incoming data packet, the router examines header information within the packet to identify the destination for the packet. Based on the header information, the router accesses the routing table, selects an appropriate route for the packet and forwards the packet accordingly.

Conventional routers typically include a mechanism, referred to herein as a management interface, for directly or remotely configuring the router. By interacting with the management interface, various clients, such as human users and automated scripts, can perform a large number of configuration tasks. For example, the clients may configure interface cards of the router, adjust parameters for the supported network protocols, specify the physical components within the routing device, modify the routing information maintained by the router, access software modules and other resources residing on the router, and perform other configuration tasks.

In some routers, the management interface allows a client to configure the present operational configuration of the router using a commit-based model. In a commit-based model, a client issues one or more configuration commands, and then directs the management interface to apply the commands by issuing a "commit" command. Typically, the management interface maintains a copy of the operational configuration, i.e., a candidate configuration, to which the management interface applies the one or more configuration commands. Upon receiving a commit command, the management interface transfers changes made to the candidate configuration to the operational configuration.

In some instances, the management interface may validate the candidate configuration prior to transferring the changes. For example, the candidate configuration typically conforms to a defined standard, and the management interface checks the changed candidate configuration against syntactical and semantic rules specified by the standard. Thus, in verifying the changed candidate configuration, the management interface attempts to ensure that the changed candidate configuration is generally semantically and syntactically correct in view of the defined standard.

In the event the changed candidate configuration does not conform to one or more of the rules, the management interface typically issues errors or warnings to inform the client that the changed candidate configuration has violated one or more of the rules. If an error is found, the management interface may not transfer the changes to the operational configuration since the changed candidate configuration may cause the router to enter an unstable state. If a warning is found, the management interface may transfer the changes, but the router may not achieve optimal operation once the changes are transferred.

As the complexity of computing networks has increased, clients who manage these devices are subject to an increasing number of implementation-specific configuration options that vary depending on the specific needs of the networks within which the devices operate. For example, due to service level agreements, a network manager may require that certain routers be configured to route traffic along specific routes within a network to control bandwidth distribution within the network. As another example, a router may be configured to operate as an edge router, a service router, or a core router, and the configuration of the router may be tailored to each implementation.

Often the network manager defines implementation-specific configuration policies to which network devices must conform. These implementation-specific configuration policies are often conveyed to customers orally and/or via documents, memos, email and the like.

In some instances, a customer may inadvertently or intentionally configure a network device to violate the policies specified by the network manager. In these instances, a conventional commit-based verification process will not detect the misconfiguration, as the candidate configuration is often semantically and syntactically correct. As a result, the management interface may transfer the changes made to the candidate configuration to the operational configuration, allowing the network device to operate in a manner that violates implementation-specific configuration policies.

SUMMARY

In general, techniques are described for automatically applying implementation-specific configuration policies to configuration data within a network device. More specifically, the techniques provide an automated process for applying the implementation-specific configuration policies prior to "committing" changes made to the configuration data.

In accordance with the techniques, a network device, such as a router, automatically applies one or more implementation-specific configuration policies to a copy of edited candidate configuration data upon receiving a commit command. The implementation-specific configuration policies comprise user-defined checks and may, for example, take the form of Extensible Style Language Transforms (XSLT) scripts, Perl scripts, or other automated mechanisms. In a non-commit-based model, the network device automatically applies one or more implementation-specific configuration policies in response to a command to edit configuration data. In either model, the network device may apply the one or more implementation-specific configuration policies based on an authorization level of the client as determined by identification information entered by the client.

In one embodiment, a method comprises applying changes to candidate configuration data of a network device, and applying an implementation-specific configuration policy to alter the changes to the candidate configuration data. The method further comprises committing the altered candidate configuration data to operational configuration data of the network device.

In another embodiment, a system comprises memory to store operational configuration data and candidate configuration data, and a control unit to apply an implementation-specific configuration policy to alter changes to the candidate configuration data. The control unit selectively commits the altered candidate configuration data to the operational configuration data.

In another embodiment, a computer-readable medium comprises instructions to cause a processor to apply changes to candidate configuration data of a network device, and apply an implementation-specific configuration policy to alter the changes to the candidate configuration data. The instructions cause the processor to further selectively commit the altered candidate configuration data to the operational configuration data of the network device.

The techniques may provide one or more advantages. For example, automatic application of implementation-specific configuration policies may allow a network device to detect configuration errors that are otherwise semantically and syntactically correct. In some instances, the implementation-specific configuration policies may correct these configuration errors as well as correct other semantic and syntax errors prior to performing a conventional commit-based verification process. As a result, the techniques may help ensure compliance with implementation-specific requirements set forth by a network manager or service provider while providing, in some instances, proactive error correction.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
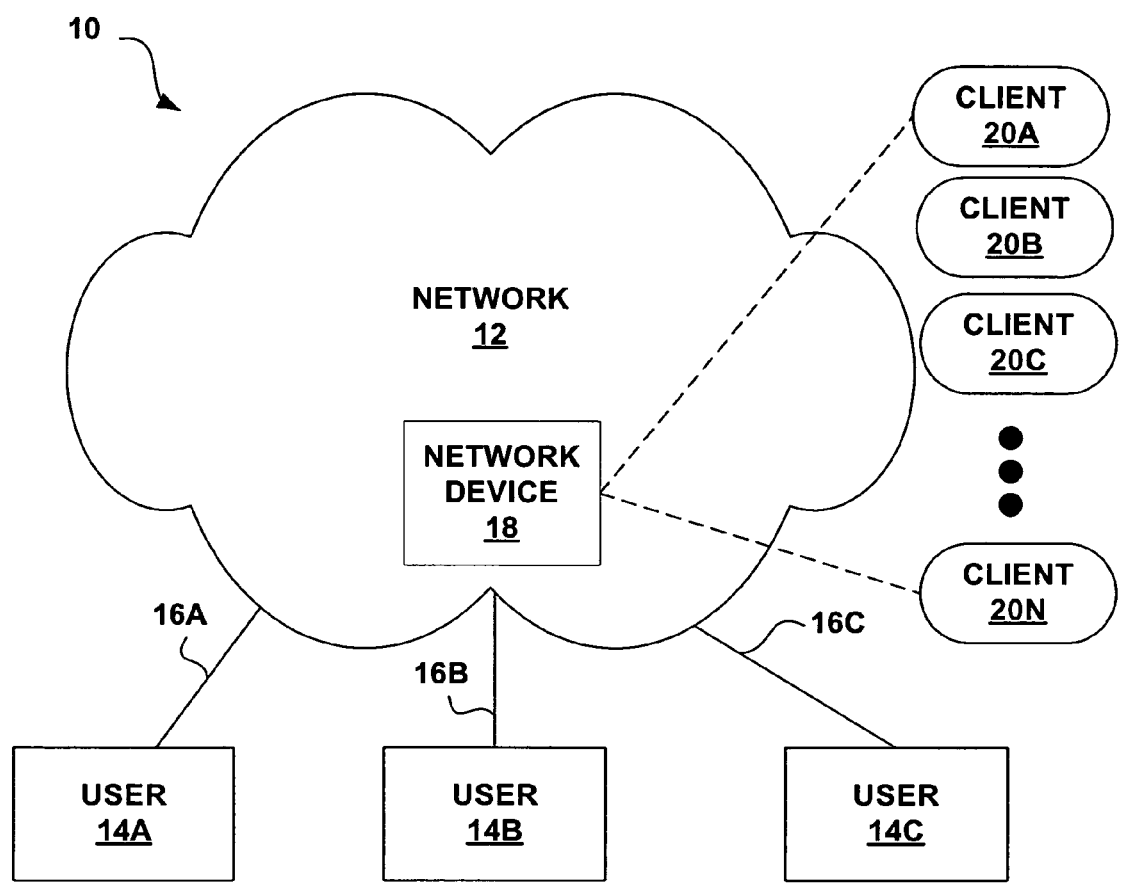
FIG. 1 is a block diagram illustrating an example computer network in which a network device supports implementation-specific configuration policies consistent with the principles of the invention.

FIG. 1 is a block diagram illustrating an example computer environment 10 in which a network device 18 supports implementation-specific configuration policies consistent with the principles of the invention. In the illustrated example, computer environment 10 comprises a network 12 that may be accessed by users 14A-14C (collectively, "users 14") via one of links 16A-16C (collectively, "links 16"). Each of users 14 represents an entity, such as an individual or an organization, that accesses network 12 to communicate with other users connected to network 12. Links 16 may be digital subscriber lines, cables, T1 lines, T3 lines, or other network connections.

Network device 18 represents any device operating within computing environment 10, such as a network hub, network switch, network router, or the like. Network device 18 includes a management interface that allows various clients 20A-20N (collectively, "clients 20"), such as human users and automated scripts, to configure network device 18. For example, network device 18 may be a network router, and clients 20 may specify configuration information to configure interface cards of the router, adjust parameters for the supported network protocols, specify the physical components within the router, modify the routing information maintained by the router, and access software modules and other resources residing on the router.

As described in detail, network device 18 supports implementation-specific configuration policies that may be defined and customized by one or more of clients 20. Network device 18 automatically applies implementation-specific configuration policies to configuration data prior to operating in accordance with the configuration data. For example, network device 18 may support a commit-based model, and may automatically apply one or more implementation-specific configuration policies to edited candidate configuration data upon receiving a commit command from any of clients 20. Alternatively, network device may not support a commit-based model, and may automatically apply one or more implementation-specific configuration policies in response to a configuration command to edit configuration data.

For example, one of clients 20, such as client 20A, may establish implementation-specific configuration policies based on particular requirements of computer environment 10, service level agreements with users 14, or other requirements. As one example, client 20A may define one or more policies to allocate bandwidth to users 14 based on Quality of Service (QoS) specifications of service level agreements or contracts between users 14 and a service provider associated with network 12. Network device 18 may apply this implementation-specific configuration policy to ensure that clients 20 do not configure network device 18 to exceed the limits specified by the agreements.

In this manner, client 20A can establish implementation-specific configuration policies to prohibit network device 18 from being configured in a manner that is not consistent with the intended implementation of network device 18 in network 12. Consequently, network device 18 may automatically detect configuration errors that are otherwise semantically and syntactically correct. As a result, network device 18 may help ensure compliance with implementation-specific requirements set forth by a network manager or service provider.

In the event any of clients 20 attempt to modify configuration data in a manner that violates one of the one or more implementation-specific configuration policies, network device 18 may issue errors, warnings or combinations thereof. For example, network device 18 may issue an error when the modified configuration data violates an implementation-specific configuration policy that may leave network device 18 in an unstable or inoperable state. As another example, network device 18 may issue an error when the modified configuration data does not comply with a requirement of a service level agreement. In contrast, network device 18 may issue a warning when the modified configuration data may only degrade the performance of network device 18, but would not render the network device unstable or otherwise operate the network device in a manner inconsistent with service level agreements or requirements of computer environment 10. If an error is found, network device 18 may not commit the changes to the configuration data, i.e., network device 18 rejects the changes to the configuration data. If a warning is issued, network device 18 may nevertheless commit the changes.

In some embodiments, network device 18 may, in response to a detected error and/or warning, alter the changes to the configuration data to proactively correct the detected error and/or warning. For example, network device 18 may determine that modified configuration data does not comply with an implementation-specific configuration policy and automatically alter the changes to the configuration data so that the modified configuration data is in compliance with the implementation-specific configuration policy. In utilizing the implementation-specific configuration policies, network device 18 may also determine syntactical and semantic errors and/or warnings and proactively correct these errors and/or warnings by altering the modifications to the configuration data. In this manner, network device 18 may respond to the modified configuration data by altering the modified configuration data to correct errors, add configuration data, replace missing configuration data, and delete configuration data.

Network device 18 may further apply implementation-specific policies based on an authorization level associated with the one of clients 20 that is modifying the configuration data. Network device 18 may enable varying sets of implementation-specific policies based on levels associated with clients 20. For example, client 20A may be assigned an "administrator" authorization level. When client 20A accesses network device 18 and changes the configuration data, network device 18 may apply none or a limited number of implementation-specific configuration policies. Client 20B may be assigned a "manager" authorization level. In response to modified configuration data from client 20B, network device 18 automatically applies a set of implementation-specific policies associated with the manager authorization level. Similarly, client 20C may be assigned a "technician" authorization level. When processing modified configuration data from client 20C, network device 18 may automatically apply a set of implementation-specific configuration policies associated with the technician level. The sets of implementation-specific configuration policies associated with the authorization levels may increase in number and scope, i.e., become increasingly strict, as the authorization level decreases.

Figure 2:
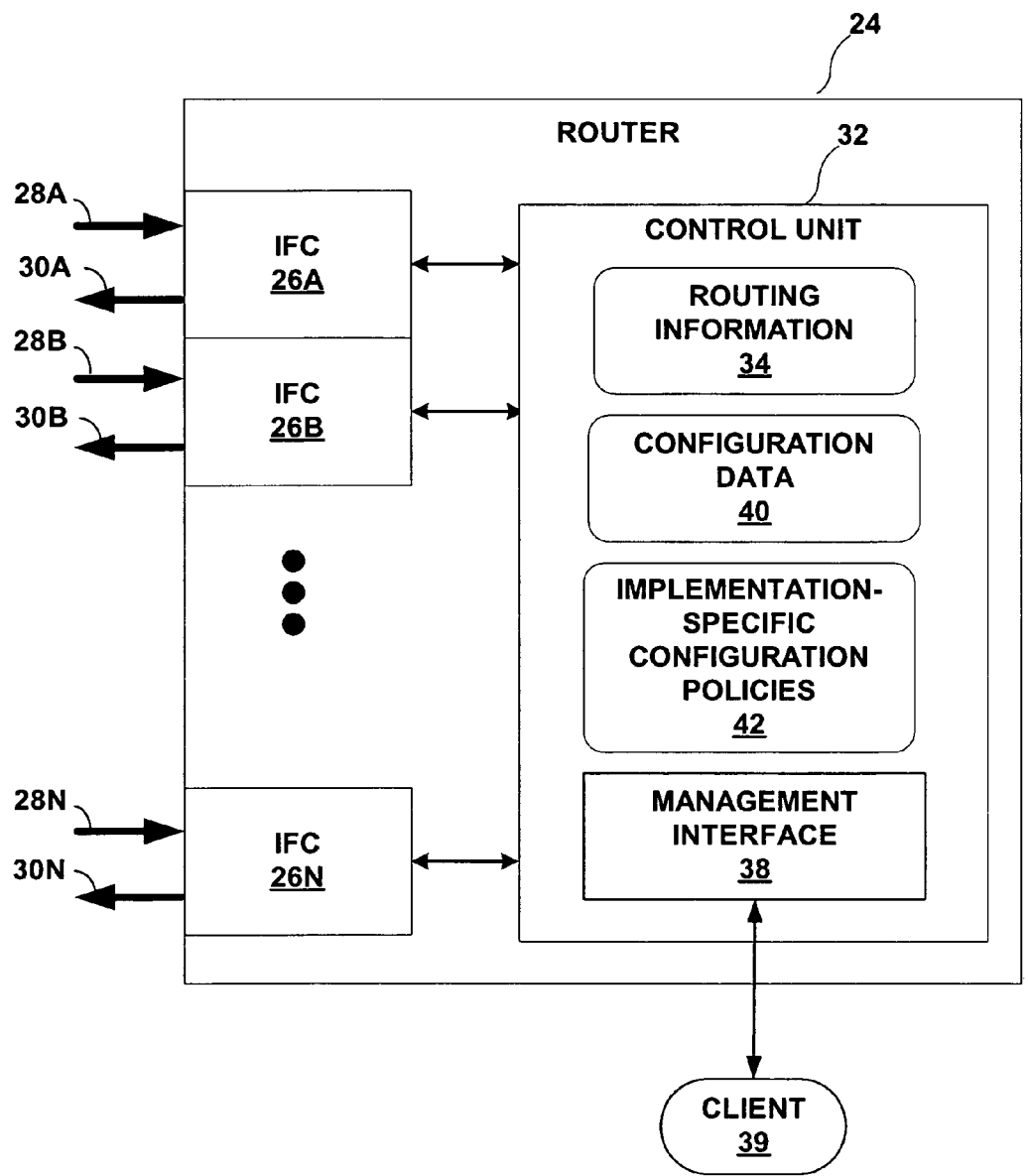
FIG. 2 is a block diagram illustrating an example network router that automatically applies implementation-specific configuration policies consistent with the principles of the invention.

FIG. 2 is a block diagram illustrating an example network router 24 that applies implementation-specific configuration policies consistent with the principles of the invention. In the example of FIG. 2, router 24 includes a set of one or more interface cards (IFCs) 26A-26N (collectively, "IFCs 26") that receive and send packets via network links 28A-28N (collectively, "network links 28") and 30A-30N (collectively, "network links 30"), respectively. IFCs 26 are typically coupled to network links 28, 30 via one or more interface ports (not shown).

Router 24 further comprises a control unit 32 that maintains routing information 34. Routing information 34 describes the topology of a network and, in particular, routes through the network. Routing information 34 may include, for example, route data that describes various routes within the network, and corresponding next hop data indicating appropriate neighboring devices within the network for each of the routes. Control unit 32 periodically updates routing information 34 to accurately reflect the topology of the network. In general, upon receiving a packet via one of inbound network links 28, control unit 32 determines a destination for the packet and outputs the packet on one of outbound network links 30 based on the determination.

Control unit 32 receives configuration input from a client 39 via a management interface 38. Management interface 38 may, for example, present a command line interface (CLI) or other suitable interface, for receiving and processing user or script-driven commands. Control unit 32 stores the configuration input received from client 39 as configuration data 40, which may take the form of a text file, such as an ASCII file. Alternatively, control unit 32 may process the configuration input and generate configuration data 40 in any one of a number of forms, such as one or more databases, tables, data structures, or other storage format.

In response to receiving a configure command from client 39, management interface 38 parses the command, and places router 24 in a configuration mode for receiving the configuration input from client 39. The configuration input may, for example, take the form of one or more text-based commands for adding new settings to the current configuration of the router, commands for deleting or modifying existing settings of the current configuration, or combinations thereof. Router 24 parses and processes the configuration input from client 39 to update configuration data 40.

During this process, in addition to performing syntax and semantic validation, management interface 38 automatically applies implementation-specific configuration policies 42 to validate the configuration input received from client 39. Management interface 38 may, for example, automatically invoke one or more scripts that apply one or more implementation-specific configuration policies 42 upon receiving a commit command from client 39. The scripts may be written in a programming language, such as Perl, C, C++, or Java. Alternatively, management interface 38 may comprise hardware, firmware, or combinations thereof to apply implementation-specific configuration policies to configuration input received from client 39.

In addition, client 39 may interact with management interface 38 to define implementation-specific configuration policies 42. Management interface 38 may receive input from client 39 and update one of implementation-specific configuration policies 42 based on the input. Alternatively, in some instances, client 39 loads or specifies implementation-specific configuration policies 42 as one or more user-defined Extensible Style Language Transformation (XSLT) scripts. Management interface 38, in these instances, supports execution of the one or more XSLT scripts to enable application of implementation-specific configuration policies 42.

In some embodiments, management interface 38 may not conform to a commit-based model for updating configuration data 40, i.e., a model where client 39 enters a commit command to apply changes. Alternatively, management interface 38 may apply implementation-specific configuration policies 42 each time client 39 enters a configuration command and prior to updating configuration data 40.

Management interface 38 may select and apply a subset of implementation-specific configuration policies 42 based on an authorization level associated with client 39, as described above. For example, based on identification information provided by client 39, router 24 determines an authorization level and selects an appropriate set of implementation-specific configuration policies 42 for application to the configuration input received from the client.

Implementation-specific configuration policies 42 may utilize general status information of router 24 when validating the configuration input 38. For example, implementation-specific configuration policies 42 may validate the configuration input received from client 39 in view of a current date or time, the number of interface cards 26, an Internet protocol address associated with the client, the number of ports associated with links 28 and 30, or other status information pertinent to the operation of router 24.

In this manner, router 24 supports automatic application of implementation-specific configuration policies 42 to configuration input received from client 39. The use of scripts, such as XSLT scripts, to define implementation-specific configuration policies 42 may allow router 24 to provide a comprehensive and flexible mechanism for validation of the configuration input prior to updating configuration data 40. As described above, implementation-specific configuration policies 42 may also allow router 24 to automatically alter changes to configuration data 40, thereby providing router 24 with proactive error correction. The versatility of scripts further allows clients 20 to tailor implementation-specific configuration policies as changes occur in the network. Moreover, implementation-specific configuration policies allow router 24 to detect configuration errors that are otherwise semantically and syntactically correct.

Figure 3:
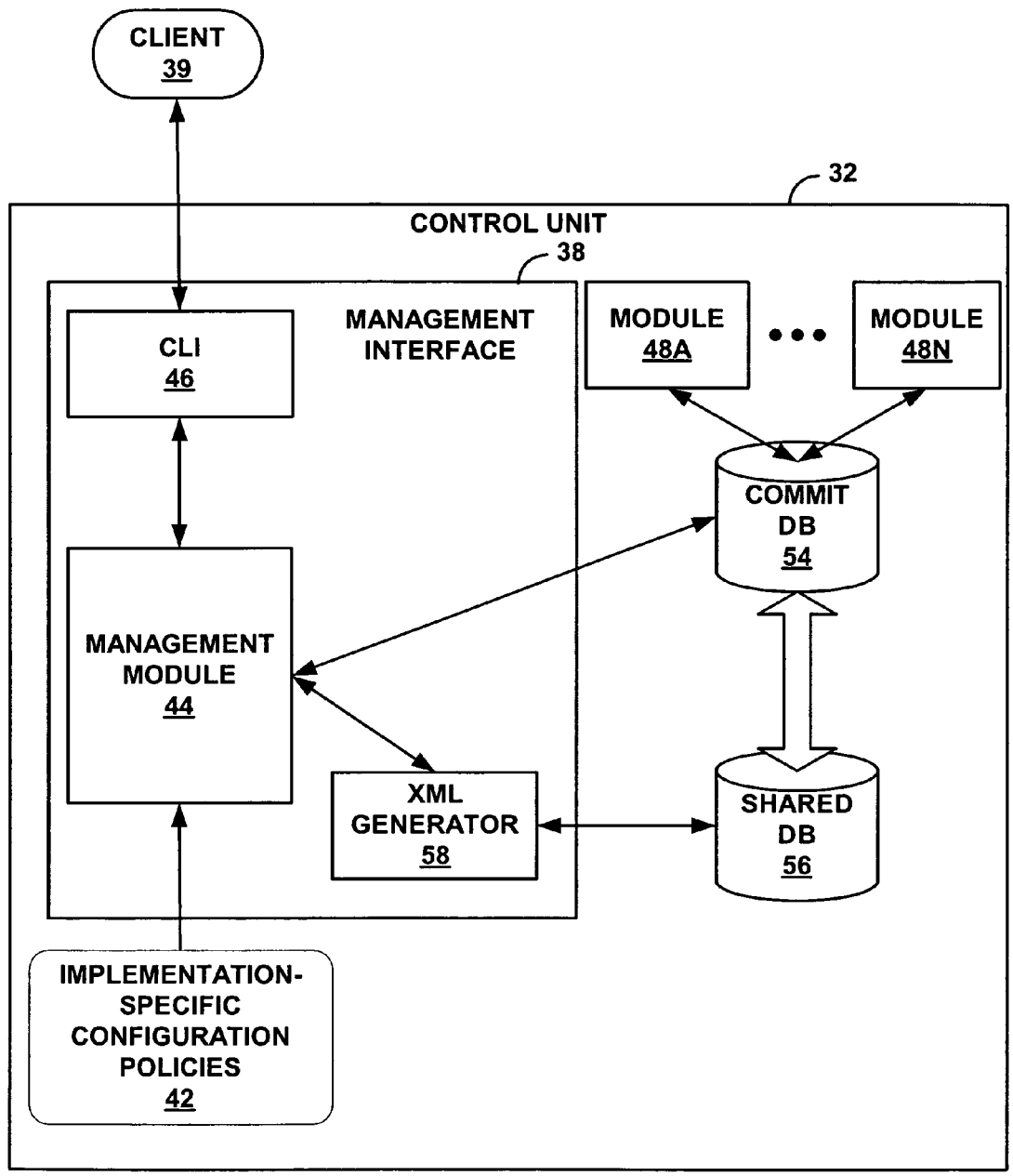
FIG. 3 is a block diagram illustrating an example embodiment of a control unit of the router of FIG. 2.

FIG. 3 is a block diagram illustrating an example embodiment of certain elements of control unit 32 (FIG. 2) consistent with the principles of the invention. In the exemplary embodiment of FIG. 3, management interface 38 comprises management module 44 that communicates with client 39 via a command line interface (CLI) 46. CLI 46 serves as a daemon process that presents a text-based interface for interacting with client 39. Upon receiving a command or a series of commands, e.g., an automated script, from client 39, CLI 46 relays the requests to management module 44. For example, via CLI 46, client 39 may enter input to update one or more of implementation-specific configuration policies 42 and management module 44 may update the one or more of implementation-specific configuration policies 42 based on the input. In some instances, CLI 46 may allow direct communication between client 39 and management module 44.

Control unit 32 may further include one or more software modules 48A-48N (collectively, "software modules 48"). Software modules 48 represent threads of execution, and typically execute within an operating environment provided by an operating system. Software modules 48 may, for example, include a routing protocol module to administer protocols supported by router 24 (FIG. 2), a chassis module to account for the physical components of router 24, a device configuration module to control the physical configuration of router 24, or other software modules.

In addition, control unit 32 includes a committed data source, referred to herein as committed database (COMMIT DB) 54, that stores an operational configuration of router 24. In other words, router 24 operates in accordance with configuration information stored in committed database 54. Control unit 32 further includes a shared data source, referred to herein as shared database (SHARED DB) 56, that contains a copy of the configuration data of committed database 54, i.e., candidate configuration, that is typically used for editing and modification without impacting operation of router 24.

As described herein, management module 44 applies implementation-specific configuration policies 42 upon receiving a commit command from client 39. Prior to issuing the commit command, client 39 typically accesses router 24 via CLI 46 and enters identification information, such as a username, a password and other pertinent identification information. CLI 46 passes the identification information to management module 44, which authenticates client 39 based on the identification information and determines an authorization level associated with the client. After successful authentication, client 39 provides configuration input in the form of one or more commands via CLI 46. Client 39 may enter the commands remotely via an established session with router 24, or locally via a mouse, keyboard, touch screen, or other input mechanism.

For example, client 39, as described above, may enter a configure command to begin editing the candidate configuration stored within shared database 56. Client 39 may enter the following exemplary command sequence to edit the candidate configuration:
user@host> configure
Entering configuration mode
user@host> set ip pim sparse-dense-mode
The configuration has been changed but not committed
.
.
.
user@host> commit In the above example, client 39 enters the configure command, causing management module 44 to display a message at client 39 indicating the status of router 24, and more particularly, the status of the candidate configuration stored within shared database 56. Next, client 39 enters the set ip pim sparse-dense-mode configuration command to enable a Protocol Independent Multicast (PIM) protocol and to specify that the PIM protocol operate in the sparse-dense mode. Client 39 may continue to edit the configuration by entering further commands. Upon completing the configuration session, client 39 specifies that the changes made to the candidate configuration of shared database 56 are to be transferred to the operational configuration by entering a commit command.

In response to receiving the commit command via CLI 46, management module 44 processes the commit command and retrieves a copy of the candidate configuration stored within shared database 56. More specifically, management module 44 directs XML generator 58 to generate a copy of the candidate configuration in conformance with the Extensible Markup Language (XML). XML generator 58 accesses shared database 56 and retrieves a copy of the candidate configuration. XML generator 58 processes the copy of the candidate configuration and constructs the XML version of the candidate configuration from the copy of the candidate configuration in accordance with XML standards, e.g., as defined by the World Wide Web Consortium (W3C). Management module 44 receives the XML version of the candidate configuration and, based on status information for router 24, and in some instances the authorization level of client 39, selects a set of zero or more implementation-specific configuration policies 42 to apply to the XML version of the candidate configuration.

In one embodiment, management module 44 stores and applies implementation-specific configuration policies 42 as XSLT scripts. These XSLT scripts may utilize the status information, such as current date and time, for use in automated validation of the XML version of the candidate configuration. Accordingly, management module 44 supports execution of the XSLT scripts, i.e., provides XML libraries for the execution of the XSLT script.

In this exemplary embodiment, management module 44 applies implementation-specific configuration policies 42 as XSLT script to perform transformations on the XML version of the candidate configuration. More specifically, the XSLT scripts parse the XML version of the candidate configuration and extract pertinent data. The XSLT scripts compare the extracted data to specifications defined within the XSLT script, e.g., via a network manager or other client 39. The XSLT script may further compare the extracted data to status information. In the event the extracted data does not satisfy the specifications defined by the XSLT script, management module 44 issues one or more errors and/or warnings to client 39 via CLI 46. In the event the extracted data meets the specifications, management module 44 may output an indication that the candidate configuration has been validated in accordance with application of implementation-specific configuration policies 42.

In addition to validating the XML version of the candidate configuration, the XSLT script may alter the XML version of the candidate configuration. In some embodiments, for example, the XSLT script may expand an identified command, e.g., an apply-template command, found in the XML version of the candidate configuration by adding configuration data to the XML version of the candidate configuration based on parameters specified by the command. As another example, the XSLT script may validate the XML version of the candidate configuration to determine any errors and/or warnings, and then alter the XML version of the candidate configuration so as to correct possibly all or a portion of the determined errors and/or warnings. The XSLT script may replace portions of the XML version of the configuration data with corrected configuration data prior to when management interface 38 initiates a conventional verification process, i.e., semantic and syntax checks, and thus providing proactive error correction.

Upon successful application of one or more of implementation-specific policies 42, management module 44 transfers the changes made to the candidate configuration stored within shared database 56 to the operational configuration stored within committed database 54. After transferring the changes, router 24 operates in accordance with the recently updated operational configuration. In this manner, router 24 applies implementation-specific configuration policies to ensure that client 39 does not provide semantically and syntactically incorrect configuration input that violates implementation-specific requirements.

While described herein in to include XML generator 58, management interface 38 may alternatively include a XML Application Program Interface (API) that accepts and parses XSLT scripts, for example, to generate command sequences acceptable to management interface 38. Management interface 38 may execute the command sequences to perform checks specified in the XSLT script on a temporary copy of the candidate configuration stored in a temporary database (not shown).

Figure 4:
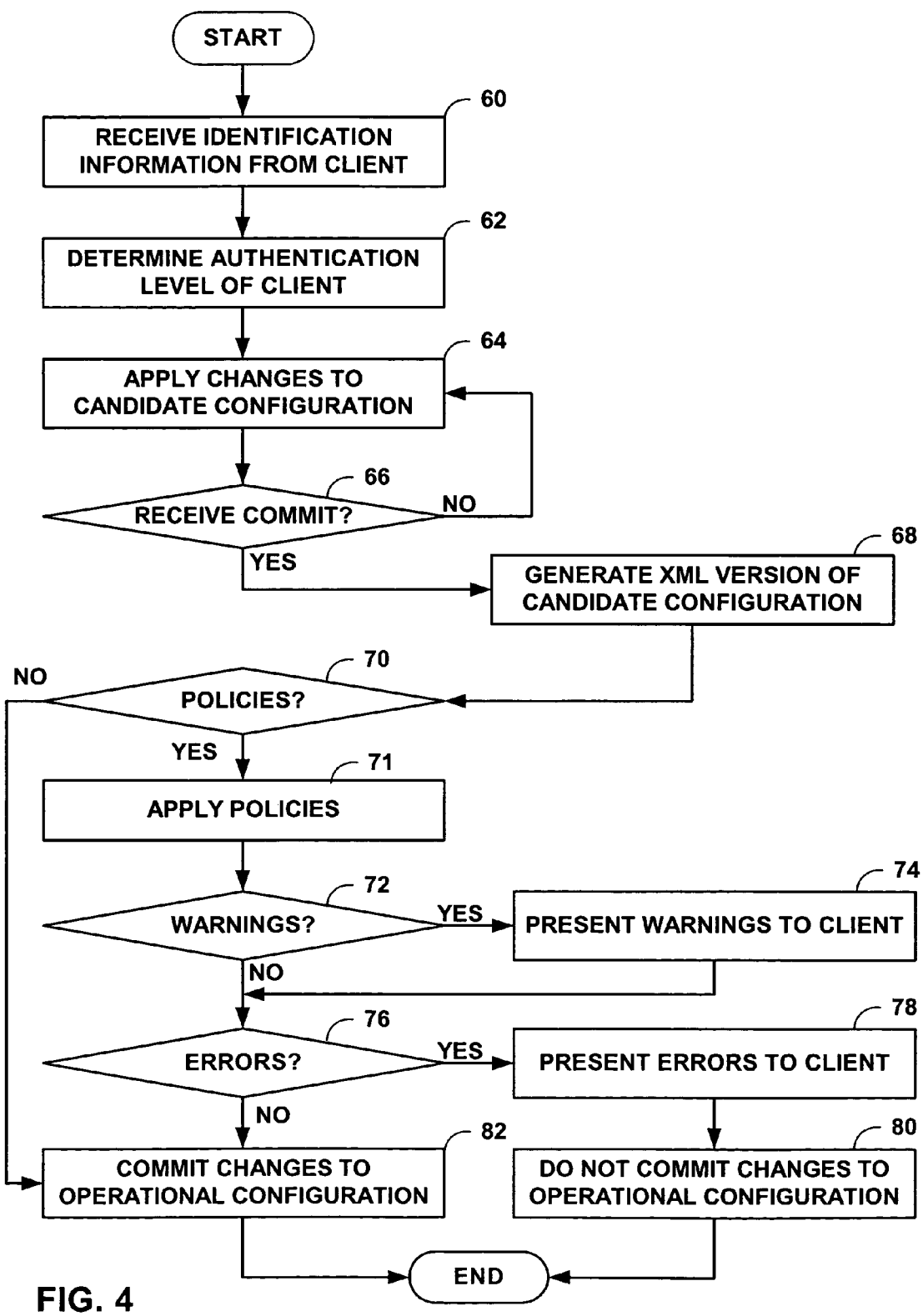
FIG. 4 is a flowchart illustrating example operation of a network device automatically applying implementation-specific configuration policies in accordance with the principles of the invention.

FIG. 4 is a flowchart illustrating example operation of a network device, e.g., router 24 of FIG. 2, that automatically applies implementation-specific configuration policies in accordance with the principles of the invention. Initially, router 24 receives identification information from client 39 during a login process (60). CLI 46 forwards the identification information to management module 44, which determines the authorization level associated with client 39 (62), as discussed above.

Once management module 44 has authenticated client 39, the client provides commands to modify the candidate configuration stored within shared database 56 (64). In some embodiments, management module 44 immediately applies changes made to the candidate configuration after receiving each command. For ease of illustration, however, the management module is assumed to operate within the context of a commit-based model in which an explicit commit command is used. With the commit-based model, management module 44 may receive additional commands and apply further changes to the candidate configuration without transferring the changes to the operational configuration.

Upon receiving the commit command (66), management module 44 directs XML generator 58 to generate an XML version of the candidate configuration stored within shared database 56, as described above (68). Management module 44 also collects status information, such as status information generated by software modules 48. In some embodiments, management module 44 determine a set of implementation-specific configuration policies 42 to apply to the XML version of the configuration data based on the authorization level associated with client 39.

In other embodiments, management module 44 determines whether any implementation-specific policies have been defined (70). If implementation-specific configuration policies 42 are not defined, management module 44 commits the changes made to the candidate configuration to the operational configuration stored within committed database 54 (82). If, however, management module 44 determines that implementation-specific configuration policies 42 are defined (70), management module 44 applies the policies to the XML version of the candidate configuration.

For example, implementation-specific configuration policies 42 may comprise XSLT scripts that define a number of checks to be performed on the XML version of the candidate configuration, such as the exemplary policy listed below.

```
<xsl:template match="/">
    <xsl:if test="not(configuration/system/root-authentication)">
        <xnm:error>
            <xnm:path>system root-authentication</xnm:path>
            <xnm:message>Missing required configuration</xnm:message>
        </xnm:error>
    </xsl:if>
    <xsl:apply-templates select="configuration"/>
</xsl:template>
```

As shown above in the second line of the exemplary policy, a first check is defined to perform an "if test" to determine whether the candidate configuration is not present. In the event the configuration is not present, the check issues an error as shown by the "<xnm:error>" tag in the third line. The error incorporates a message as shown by the "<xnm:message>" tag in the fifth line. The message indicates that there is a "Missing required configuration." In the event the candidate configuration is present, the exemplary policy applies additional policies, e.g., templates, as shown by the "<xsl:apply-templates="configuration"/>" tag in the eighth line, such as the following exemplary policy.

```
<xsl:template match="protocols/pim/interface[version = 1]">
    <xnm:error>
        <xnm:path>
            <xsl:text>protocols pim interface</xsl:text>
            <xsl:value-of select="name"/>
        </xnm:path>
        <xnm:statement>version 1;</xnm:statement>
        <xnm:message>PIM version 1 is not supported</xnm:message>
    </xnm:error>
</xsl:template>
```

The first line of this exemplary policy determines whether the Protocol Independent Multicast (PIM) protocol interface version number is set to a value of "1." If the match fails, an error occurs, and a message is produced to indicate that "PIM version 1 is not supported" by router 24. If the match succeeds, management module 44 may apply another one of implementation-specific configuration policies 42, or may terminate application of the implementation-specific configuration policies due to the error.

In applying another one of implementation-specific configuration policies 42, management module 44 may apply one of implementation-specific configuration policies 42 that alters the XML version of the candidate configuration. Listed below is an exemplary implementation-specific configuration policy that alters the candidate configuration by replacing configuration data.

```
<xsl:template match="system/host-name">
    <xsl:if test="not( . . . /domain-name) and contains(., '.')">
        <configuration-change>
            <system>
                <domain-name>
                    <xsl:value-of select="substring-after(., '.')"/>
                </domain-name>
            </system>
        </configuration-change>
    </xsl:if>
</xsl:template>
```

This example policy applies an "if test" to determine whether the domain name is "not (../domain-name)" and contains the '•' character. If the test fails, the policy alters the XML version of the candidate configuration by replacing the value of the substring after the '•' character. If the test succeeds then no changes are made to the XML version of the candidate configuration.

Other implementation-specific configuration policies can alter the XML version of the candidate configuration by adding configuration data, removing configuration data, and other such operations besides replacing configuration data. As a final example, an implementation specific configuration policy is listed below as an XSLT script that can add configuration data.

```
<xsl:template match="apply-template[starts-with(., 'simple-interface(')]">
    <xsl:param name="address" select="substring-after(substring-before
(.,')'),'(')"/>
    <configuration-expand>
        <interfaces>
            <interface>
                <name><xsl:value-of select=" . . . /name"/></name>
                <unit>
                    <name>0</name>
                    <family>
                        <inet>
                            <address><xsl:value-of select="$value"/></address>
                            <filter>
                                <input>simple</input>
                            </filter>
                        </inet>
                        <iso/>
                        <mpls/>
                    </family>
                </unit>
            </interface>
        </interfaces>
    </configuration-expand>
</xsl:template>
```

This exemplary policy determines, in the first line, whether an apply-template command is located in the XML version of the candidate configuration. In finding a match, the XSLT script gathers parameters specified by the apply-template command, such as a template file name, as listed above in the second line of the XSLT script. The XSLT script processes the gathered parameters, accesses the template and expands, i.e., inserts the contents of, the specified template into the XML version of the candidate configuration, as indicated by the "<input>" tag in the above XSLT script.

In the event the application of the identified set of implementation-specific policies generate warnings (72), or as in some embodiments, warning that cannot be corrected, management module 44 presents the warning to client 39 via CLI 46 (74). Similarly, if errors occur (76), or as in some embodiments, errors that cannot be corrected, management module 44 presents the errors to client 39 (78). In the event of an error, management module 44 may not commit the changes made to the candidate configuration to the operational configuration (80). However, if no errors are generated, management module 44 transfers, i.e., commits, the changes made to the candidate configuration to the operational configuration (82).

Various embodiments of the invention have been described. For example, the principles of the invention may be readily applied to a variety of network devices. In addition, although the techniques have been described as elements embodied within a network device, the described elements may be distributed to multiple devices. The term "system," is used herein to generally refer to embodiments of the invention in which the described elements are embodied within a single network device or distributed to multiple network devices. These and other embodiments are within the scope of the following claims.

The invention claimed is:

1. A method comprising:
    receiving confirmation information;
    applying changes to candidate configuration data of a network device in response to the received configuration information;
    applying an implementation-specific configuration policy to alter the changes that were applied to the candidate configuration data in response to the received configuration information, wherein the implementation-specific configuration policy comprises user-defined checks that prohibit configuration of the network device in a manner inconsistent with an intended implementation of the network device even when the candidate configuration data is semantically and syntactically correct; and
    committing the altered candidate configuration data to operational configuration data of the network device.

2. The method of claim 1, wherein applying the implementation-specific configuration policy comprises:
    generating additional configuration data; and
    inserting the additional configuration data into the changed candidate configuration data.

3. The method of claim 2, generating additional configuration data comprises:
    identifying a configuration command within the changed candidate configuration data; and
    generating additional configuration data for the identified command.

4. The method of claim 3, wherein inserting the additional configuration data comprises inserting the additional configuration data into the changed candidate configuration data based on a location of the identified command within the changed candidate configuration data.

5. The method of claim 1, wherein applying an implementation-specific configuration policy comprises:
   receiving a commit command; and
   automatically applying the implementation-specific configuration policy in response to receiving a commit command.

6. The method of claim 1, wherein applying an implementation-specific configuration policy comprises:
   generating a copy of the candidate configuration data; and
   applying the implementation-specific configuration policy to the copy of the candidate configuration.

7. The method of claim 6, wherein applying an implementation-specific configuration policy to the copy of the candidate configuration occurs via an Extensible Markup Language (XML) Application Program Interface (API).

8. The method of claim 6,
   wherein generating a copy of the candidate configuration data comprises generating a version of the candidate configuration data that conforms to an Extensible Markup Language, and
   wherein applying an implementation-specific configuration policy comprises applying an Extensible Style Language Transformation (XSLT) script to the copy of the candidate configuration data.

9. The method of claim 1, wherein the implementation-specific configuration policy comprises an Extensible Style Language Transformation (XSLT) script.

10. A system comprising:
    a memory to store operational configuration data and candidate configuration data; and
    a control unit to receive configuration information, apply changes to candidate configuration data in response to the received configuration information, apply an implementation-specific configuration policy to alter changes that were applied to the candidate configuration data in response to the received configuration information, and commit the altered candidate configuration data to the operational configuration data, wherein the implementation-specific configuration policy comprises user-defined checks that prohibit configuration of the network device in a manner inconsistent with an intended implementation of the network device even when the candidate configuration data is semantically and syntactically correct.

11. The system of claim 10, wherein the control unit applies the implementation-specific configuration policy by generating additional configuration data, and inserting the additional configuration data into the changed candidate configuration data.

12. The system of claim 11, wherein the control unit identifies a configuration command within the changed candidate configuration data, generates the additional configuration data for the identified command, and inserts the additional configuration data into the changed candidate configuration data.

13. The system of claim 10, wherein the control unit comprises a management interface to apply the implementation-specific configuration policy, wherein the management interface receives a commit command, and automatically applies the implementation-specific policy in response to receiving the commit command.

14. The system of claim 10, wherein the control unit comprises a management interface to apply the implementation-specific configuration policy by generating a copy of the candidate configuration data and applying the implementation-specific configuration policy to the copy of the candidate configuration.

15. The system of claim 14, wherein the management interface comprises an Extensible Markup Language (XML) Application Program Interface (API) to apply the implementation-specific configuration policy to the copy of the candidate configuration.

16. The system of claim 14,
    wherein the management interface comprises an Extensible Markup Language (XML) generator to generate the copy of the candidate configuration data, wherein the copy of the candidate configuration data includes a version of the candidate configuration data that conforms to the Extensible Markup Language, and
    wherein the management interface applies an implementation-specific configuration policy comprising an Extensible Style Language Transformation (XSLT) script to the copy of the candidate configuration data.

17. A computer-readable storage medium comprising instructions to cause a processor to:
    receive configuration information;
    apply changes to candidate configuration data of a network device in response to the received configuration information;
    apply an implementation-specific configuration policy to alter the changes that were applied to the candidate configuration data in response to the received configuration information, wherein the implementation-specific configuration policy comprises user-defined checks that prohibit configuration of the network device in a manner inconsistent with an intended implementation of the network device even when the candidate configuration data is semantically and syntactically correct; and
    commit the altered candidate configuration data to operational configuration data of the network device.

18. The computer-readable storage medium of claim 17, further comprising instruction to cause the processor to apply the implementation-specific configuration policy by generating additional configuration data, and inserting the additional configuration data into the changed candidate configuration data.

19. The computer-readable storage medium of claim 18, further comprising instructions to cause the processor to identify a configuration command within the changed candidate configuration data.

20. The computer-readable storage medium of claim 19, further comprising instruction to cause the processor to generate the additional configuration data for the identified command, and insert the additional configuration data into the changed candidate configuration data based on a location of the identified command within the candidate configuration data.

21. The computer-readable storage medium of claim 17, further comprising instructions to cause the processor to:
    receive a commit command; and
    automatically apply the implementation-specific policy in response to receiving the commit command.

22. The computer-readable storage medium of claim 17, further comprising instructions to cause the processor to:
    generate a copy of the candidate configuration data; and
    apply the implementation-specific configuration policy to the copy of the candidate configuration.

23. The computer-readable storage medium of claim 22, further comprising instruction to cause the processor to apply an implementation-specific configuration policy to the copy of the candidate configuration via an Extensible Markup Language (XML) Application Program Interface (API).

24. The computer-readable storage medium of claim 22, further comprising instructions to cause the processor to generate a version of the candidate configuration data that conforms to an Extensible Markup Language.

25. The computer-readable storage medium of claim 24, wherein the implementation-specific configuration policy includes an Extensible Style Language Transformation script and further comprising instructions to cause the processor to apply the Extensible Style Language Transformation (XSLT) script to the copy of the candidate configuration data.

* * * * *

UNITED STATES PATENT AND TRADEMARK OFFICE
CERTIFICATE OF CORRECTION

PATENT NO. : 7,376,719 B1 Page 1 of 1
APPLICATION NO. : 10/824155
DATED : May 20, 2008
INVENTOR(S) : Philip A. Shafer et al.

It is certified that error appears in the above-identified patent and that said Letters Patent is hereby corrected as shown below:

Column 12, line 38 (claim 1), "confirmation" should read --configuration--.

Signed and Sealed this

Second Day of September, 2008

JON W. DUDAS
*Director of the United States Patent and Trademark Office*